(12) United States Patent
Maes

(10) Patent No.: US 8,744,055 B2
(45) Date of Patent: Jun. 3, 2014

(54) ABSTRACT APPLICATION DISPATCHER

(75) Inventor: Stephane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 904 days.

(21) Appl. No.: 11/969,343

(22) Filed: Jan. 4, 2008

(65) Prior Publication Data
US 2008/0232567 A1 Sep. 25, 2008

Related U.S. Application Data

(60) Provisional application No. 60/896,676, filed on Mar. 23, 2007.

(51) Int. Cl.
*H04M 3/42* (2006.01)
*H04L 12/16* (2006.01)

(52) U.S. Cl.
USPC ............ 379/201.02; 379/201.01; 379/201.05; 379/207.02; 370/259; 455/414.1

(58) Field of Classification Search
USPC ............ 379/201.09, 201.01, 201.02, 201.03, 379/201.07, 201.08, 207.02, 201.05; 709/104; 370/252, 259; 455/519, 414.1
See application file for complete search history.

(56) References Cited

U.S. PATENT DOCUMENTS

| | | | |
|---|---|---|---|
| 5,414,812 A | 5/1995 | Filip et al. | |
| 5,613,060 A | 3/1997 | Britton et al. | |
| 5,699,513 A | 12/1997 | Feigen et al. | |
| 5,737,321 A | 4/1998 | Takahashi | |
| 5,786,770 A | 7/1998 | Thompson | |
| 5,850,517 A | 12/1998 | Verkler et al. | |
| 5,867,665 A | 2/1999 | Butman et al. | |
| 5,946,634 A | 8/1999 | Korpela | |
| 6,115,690 A | 9/2000 | Wong | |
| 6,119,104 A | 9/2000 | Brumbelow | |
| 6,128,645 A | 10/2000 | Butman et al. | |
| 6,157,941 A | 12/2000 | Verkler et al. | |

(Continued)

FOREIGN PATENT DOCUMENTS

| | | |
|---|---|---|
| EP | 2 034 748 A1 | 3/2009 |
| WO | 2007134468 A1 | 11/2007 |

OTHER PUBLICATIONS

Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.

(Continued)

*Primary Examiner* — Thjuan K Addy
(74) *Attorney, Agent, or Firm* — Kilpatrick Townsend & Stockton LLP

(57) ABSTRACT

Embodiments of the invention provide systems and methods for providing one or more services in a communication session such as a call or other media exchange independent of supporting network technologies. According to one embodiment, a system for providing one or more services in a communication session can comprise a communication network and an application dispatcher communicatively coupled with the communication network. The application dispatcher can be adapted to determine one or more components for providing at least one service in the communication session and direct the communication session to the one or more components. According to one embodiment, determining the one or more components and directing the communication session to the one or more components can be performed independent of supporting network technologies.

45 Claims, 8 Drawing Sheets

(56) References Cited

U.S. PATENT DOCUMENTS

| | | | |
|---|---|---|---|
| 6,163,800 A | 12/2000 | Ejiri | |
| 6,192,231 B1 | 2/2001 | Chapman et al. | |
| 6,192,414 B1 | 2/2001 | Horn | |
| 6,230,271 B1 | 5/2001 | Wadlow et al. | |
| 6,272,556 B1 | 8/2001 | Gish | |
| 6,275,857 B1 | 8/2001 | McCartney | |
| 6,336,138 B1 | 1/2002 | Caswell et al. | |
| 6,374,305 B1 | 4/2002 | Gupta et al. | |
| 6,466,984 B1 | 10/2002 | Naveh et al. | |
| 6,496,864 B1 | 12/2002 | McCartney | |
| 6,553,108 B1 | 4/2003 | Felger | |
| 6,578,159 B1 | 6/2003 | Kitagawa et al. | |
| 6,611,812 B2 | 8/2003 | Hurtado et al. | |
| 6,633,560 B1 | 10/2003 | Albert et al. | |
| 6,748,570 B1 | 6/2004 | Bahrs et al. | |
| 6,792,605 B1 | 9/2004 | Roberts et al. | |
| 6,813,278 B1 | 11/2004 | Swartz et al. | |
| 6,868,413 B1 | 3/2005 | Grindrod et al. | |
| 6,965,902 B1 | 11/2005 | Ghatate | |
| 6,978,348 B2 | 12/2005 | Belknap et al. | |
| 6,981,023 B1 | 12/2005 | Hamilton et al. | |
| 6,985,939 B2 | 1/2006 | Fletcher et al. | |
| 7,003,578 B2 | 2/2006 | Kanada et al. | |
| 7,042,988 B2 | 5/2006 | Juitt et al. | |
| 7,043,538 B2 | 5/2006 | Guedalia et al. | |
| 7,072,653 B1 | 7/2006 | Sladek et al. | |
| 7,073,055 B1 | 7/2006 | Freed et al. | |
| 7,089,317 B2 | 8/2006 | Jeyaraman et al. | |
| 7,106,848 B1 | 9/2006 | Barlow et al. | |
| 7,111,060 B2 | 9/2006 | Araujo et al. | |
| 7,114,146 B2 | 9/2006 | Zhang et al. | |
| 7,114,148 B2 | 9/2006 | Irving et al. | |
| 7,133,669 B2 | 11/2006 | Nair et al. | |
| 7,143,094 B2 | 11/2006 | Arroyo et al. | |
| 7,146,616 B2 | 12/2006 | Dorner et al. | |
| 7,185,342 B1 | 2/2007 | Carrer et al. | |
| 7,194,482 B2 | 3/2007 | Larkin et al. | |
| 7,222,148 B2 | 5/2007 | Potter et al. | |
| 7,222,334 B2 | 5/2007 | Casati et al. | |
| 7,272,625 B1 | 9/2007 | Hannel et al. | |
| 7,281,029 B2 | 10/2007 | Rawat | |
| 7,295,532 B2 | 11/2007 | Haller et al. | |
| 7,302,570 B2 | 11/2007 | Beard et al. | |
| 7,340,508 B1 | 3/2008 | Kasi et al. | |
| 7,409,707 B2 | 8/2008 | Swander et al. | |
| 7,411,943 B2 | 8/2008 | Kittredge et al. | |
| 7,415,010 B1 | 8/2008 | Croak et al. | |
| 7,426,381 B2 | 9/2008 | Maes | |
| 7,433,838 B2 | 10/2008 | Welsh et al. | |
| 7,443,972 B1 | 10/2008 | Barlow et al. | |
| 7,444,620 B2 | 10/2008 | Marvin | |
| 7,447,793 B2 | 11/2008 | Morioka | |
| 7,448,022 B1 | 11/2008 | Ram et al. | |
| 7,454,399 B2 | 11/2008 | Matichuk | |
| 7,461,062 B2 | 12/2008 | Stewart et al. | |
| 7,472,349 B1 | 12/2008 | Srivastava et al. | |
| 7,519,076 B2 | 4/2009 | Janssen et al. | |
| 7,580,994 B1 | 8/2009 | Fiszman et al. | |
| 7,617,521 B2 | 11/2009 | Maes | |
| 7,630,953 B2 | 12/2009 | Stauber et al. | |
| 7,660,297 B2 | 2/2010 | Fisher et al. | |
| 7,676,813 B2 | 3/2010 | Bisset et al. | |
| 7,702,792 B2 | 4/2010 | Shaffer et al. | |
| 7,716,310 B2 | 5/2010 | Foti | |
| 7,720,926 B2 | 5/2010 | Asahara | |
| 7,752,634 B1 | 7/2010 | Saxena et al. | |
| 7,779,445 B2 | 8/2010 | Ellis | |
| 7,853,647 B2 | 12/2010 | Maes | |
| 7,860,490 B2 | 12/2010 | Maes | |
| 7,865,607 B2 | 1/2011 | Sonalkar et al. | |
| 7,873,716 B2 | 1/2011 | Maes | |
| 7,925,727 B2 | 4/2011 | Sullivan et al. | |
| 7,933,397 B2 | 4/2011 | Jain | |
| 8,023,971 B2 | 9/2011 | Egli | |
| 8,032,920 B2 | 10/2011 | Maes | |
| 8,036,362 B1 | 10/2011 | Skinner | |
| 8,060,067 B2 | 11/2011 | Tarleton et al. | |
| 8,068,860 B1 | 11/2011 | Midkiff | |
| 8,073,810 B2 | 12/2011 | Maes | |
| 8,090,848 B2 | 1/2012 | Maes | |
| 8,114,555 B2 | 2/2012 | Leonida et al. | |
| 8,121,278 B2 | 2/2012 | Leigh et al. | |
| 8,161,171 B2 | 4/2012 | Maes | |
| 8,214,503 B2 | 7/2012 | Maes | |
| 8,223,951 B1 | 7/2012 | Edelhaus et al. | |
| 8,230,449 B2 | 7/2012 | Maes | |
| 8,255,470 B2 | 8/2012 | Jackson et al. | |
| 2001/0010053 A1 | 7/2001 | Ben-Shachar et al. | |
| 2001/0016880 A1 | 8/2001 | Cai et al. | |
| 2001/0028649 A1 | 10/2001 | Pogossiants et al. | |
| 2002/0002684 A1 | 1/2002 | Fox et al. | |
| 2002/0087674 A1 | 7/2002 | Guilford et al. | |
| 2002/0099738 A1 | 7/2002 | Grant | |
| 2002/0101879 A1 | 8/2002 | Bouret | |
| 2002/0104015 A1 | 8/2002 | Barzilai et al. | |
| 2002/0111848 A1 | 8/2002 | White | |
| 2002/0120729 A1 | 8/2002 | Faccin et al. | |
| 2002/0143819 A1 | 10/2002 | Han et al. | |
| 2002/0144119 A1 | 10/2002 | Benatar | |
| 2002/0178122 A1 | 11/2002 | Maes | |
| 2002/0184373 A1 | 12/2002 | Maes | |
| 2002/0191774 A1 | 12/2002 | Creamer et al. | |
| 2002/0194388 A1 | 12/2002 | Boloker et al. | |
| 2002/0198719 A1 | 12/2002 | Gergic et al. | |
| 2002/0198991 A1 | 12/2002 | Gopalakrishnan et al. | |
| 2003/0003953 A1 | 1/2003 | Houplain | |
| 2003/0004746 A1 | 1/2003 | Kheirolomoom et al. | |
| 2003/0005034 A1 | 1/2003 | Amin | |
| 2003/0023953 A1 | 1/2003 | Lucassen et al. | |
| 2003/0046316 A1 | 3/2003 | Gergic et al. | |
| 2003/0061268 A1 | 3/2003 | Moerdijk et al. | |
| 2003/0061404 A1 | 3/2003 | Atwal et al. | |
| 2003/0115203 A1 | 6/2003 | Brown et al. | |
| 2003/0115260 A1 | 6/2003 | Edge | |
| 2003/0118167 A1 | 6/2003 | Sammon et al. | |
| 2003/0120502 A1 | 6/2003 | Robb et al. | |
| 2003/0131076 A1 | 7/2003 | Nelson et al. | |
| 2003/0135553 A1 | 7/2003 | Pendakur | |
| 2003/0140115 A1 | 7/2003 | Mehra | |
| 2003/0140131 A1 | 7/2003 | Chandrashekhar et al. | |
| 2003/0154233 A1* | 8/2003 | Patterson | 709/104 |
| 2003/0185233 A1 | 10/2003 | Ji et al. | |
| 2003/0191769 A1 | 10/2003 | Crisan et al. | |
| 2003/0191823 A1 | 10/2003 | Bansal et al. | |
| 2003/0208539 A1 | 11/2003 | Gildenblat et al. | |
| 2003/0217044 A1 | 11/2003 | Zhang et al. | |
| 2003/0229760 A1 | 12/2003 | Doyle et al. | |
| 2003/0229812 A1 | 12/2003 | Buchholz | |
| 2004/0015547 A1 | 1/2004 | Griffin et al. | |
| 2004/0015578 A1 | 1/2004 | Karakashian et al. | |
| 2004/0024720 A1 | 2/2004 | Fairweather | |
| 2004/0064528 A1 | 4/2004 | Meredith et al. | |
| 2004/0068586 A1 | 4/2004 | Xie et al. | |
| 2004/0093593 A1 | 5/2004 | Jhanwar et al. | |
| 2004/0100923 A1 | 5/2004 | Yam | |
| 2004/0110493 A1 | 6/2004 | Alvarez et al. | |
| 2004/0125758 A1 | 7/2004 | Hayduk | |
| 2004/0128546 A1 | 7/2004 | Blakley et al. | |
| 2004/0133627 A1 | 7/2004 | Kalyanaraman et al. | |
| 2004/0139319 A1 | 7/2004 | Favazza et al. | |
| 2004/0148334 A1 | 7/2004 | Arellano et al. | |
| 2004/0153545 A1 | 8/2004 | Pandya et al. | |
| 2004/0161090 A1 | 8/2004 | Digate et al. | |
| 2004/0162881 A1 | 8/2004 | Digate et al. | |
| 2004/0176988 A1 | 9/2004 | Boughannam | |
| 2004/0221005 A1 | 11/2004 | Albaugh et al. | |
| 2005/0015340 A1 | 1/2005 | Maes | |
| 2005/0021670 A1 | 1/2005 | Maes | |
| 2005/0050194 A1 | 3/2005 | Honeisen et al. | |
| 2005/0054287 A1 | 3/2005 | Kim | |
| 2005/0068167 A1 | 3/2005 | Boyer et al. | |
| 2005/0073982 A1 | 4/2005 | Corneille et al. | |
| 2005/0075115 A1 | 4/2005 | Corneille et al. | |
| 2005/0086197 A1 | 4/2005 | Boubez et al. | |

(56) References Cited

U.S. PATENT DOCUMENTS

| | | |
|---|---|---|
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1 | 10/2005 | Edery et al. |
| 2005/0239485 A1* | 10/2005 | Kundu et al. ............... 455/519 |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0112400 A1 | 5/2006 | Zhang et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1 | 3/2007 | Hakusui |
| 2007/0061397 A1 | 3/2007 | Gregorat et al. |
| 2007/0071224 A1 | 3/2007 | Shtivelman et al. |
| 2007/0088836 A1 | 4/2007 | Tai et al. |
| 2007/0099613 A1 | 5/2007 | Burgan et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0121539 A1 | 5/2007 | Kikuchi |
| 2007/0150480 A1 | 6/2007 | Hwang et al. |
| 2007/0150936 A1 | 6/2007 | Maes |
| 2007/0182541 A1 | 8/2007 | Harris et al. |
| 2007/0189466 A1 | 8/2007 | Croak et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0201376 A1* | 8/2007 | Marshall-Wilson ......... 370/252 |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0255662 A1 | 11/2007 | Tumminaro |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0043975 A1 | 2/2008 | Miloslavsky et al. |
| 2008/0049929 A1 | 2/2008 | Miloslavsky et al. |
| 2008/0080479 A1 | 4/2008 | Maes |
| 2008/0095326 A1 | 4/2008 | Qi et al. |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1 | 6/2008 | Morris |
| 2008/0151768 A1 | 6/2008 | Liu |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0212762 A1 | 9/2008 | Gray et al. |
| 2008/0222694 A1 | 9/2008 | Nakae |
| 2008/0228919 A1 | 9/2008 | Doshi et al. |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0253543 A1 | 10/2008 | Aharon |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0003362 A1 | 1/2009 | Pattabhiraman et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0022286 A1 | 1/2009 | Brunson et al. |
| 2009/0034426 A1 | 2/2009 | Luft et al. |
| 2009/0086950 A1 | 4/2009 | Vendrow et al. |
| 2009/0093240 A1 | 4/2009 | Lang |
| 2009/0106677 A1 | 4/2009 | Son et al. |
| 2009/0109959 A1 | 4/2009 | Elliott et al. |
| 2009/0112875 A1 | 4/2009 | Maes |
| 2009/0119303 A1 | 5/2009 | Rio et al. |
| 2009/0125595 A1 | 5/2009 | Maes |
| 2009/0132717 A1 | 5/2009 | Maes |
| 2009/0154681 A1 | 6/2009 | Kung et al. |
| 2009/0187919 A1 | 7/2009 | Maes |
| 2009/0190603 A1 | 7/2009 | Damola et al. |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0222858 A1 | 9/2009 | Hjelm et al. |
| 2009/0228584 A1 | 9/2009 | Maes et al. |
| 2009/0306834 A1 | 12/2009 | Hjelm et al. |
| 2009/0328051 A1 | 12/2009 | Maes |
| 2010/0037157 A1 | 2/2010 | Chang et al. |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Merino Gonzalez et al. |
| 2010/0128696 A1 | 5/2010 | Fantini et al. |
| 2010/0153865 A1 | 6/2010 | Barnes et al. |
| 2010/0185772 A1 | 7/2010 | Wang et al. |
| 2010/0192004 A1 | 7/2010 | Bauchot et al. |
| 2010/0281488 A1 | 11/2010 | Krishnamurthy et al. |
| 2011/0035443 A1 | 2/2011 | Jensen |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |

(56) References Cited

U.S. PATENT DOCUMENTS

| | | | |
|---|---|---|---|
| 2011/0258619 A1 | 10/2011 | Wookey |
| 2011/0280383 A1 | 11/2011 | Varga et al. |
| 2012/0045040 A1 | 2/2012 | Maes |
| 2012/0047506 A1 | 2/2012 | Maes |
| 2012/0106728 A1 | 5/2012 | Ghaffari et al. |
| 2012/0173745 A1 | 7/2012 | Maes |

OTHER PUBLICATIONS

O'Doherty, Phelim, "JSLEE—SIP Servlet", <http://java.sun.com/products/jain/JSLEE-SIPServlet.pdf, 2003, 13 pages.
The Parlay Group, "Specifications", <http://web.archive.org/web/20050114014707/www.parlay.org/specs/index.asp>, Jan. 14, 2005, 2 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 11/123,468, filed May 5, 2005, Advisory Action dated Jan. 18, 2011, 2 pages.
U.S. Appl. No. 12/364,642, filed Feb. 3, 2009, Office Action dated Dec. 20, 2010, 18 pages.
U.S. Appl. No. 11/357,653, filed Feb. 16, 2006, Office Action dated Jan. 20, 2011, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 11/848,347, filed Aug. 31, 2007, Final Office Action mailed Mar. 7, 2011, 21 pages.
U.S. Appl. No. 11/926,738, filed Oct. 29, 2007, Final Office Action mailed Mar. 17, 2011, 13 pages.
U.S. Appl. No. 11/943,101, filed Nov. 20, 2007, Final Office Action mailed Feb. 14, 2011, 11 pages.
U.S. Appl. No. 12/544,459, filed Aug. 20, 2009, Office Action dated Mar. 2, 2011, 10 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/939,705, filed Nov. 14, 2007, Final Office Action mailed Mar. 17, 2011, 21 pages.
U.S. Appl. No. 11/848,347, filed Aug. 31, 2007, Office Action mailed Oct. 29, 2009, 12 pages.
U.S. Appl. No. 11/951,500, filed Dec. 6, 2007, Office Action mailed Sep. 22, 2009, 24 pages.
U.S. Appl. No. 11/951,500, filed Dec. 6, 2007, Final Office Action mailed Mar. 30, 2010, 26 pages.
U.S. Appl. No. 11/877,129, filed Oct. 23, 2007, Office Action mailed Sep. 28, 2009, 15 pages.
U.S. Appl. No. 11/877,129, filed Oct. 23, 2007, Final Office Action mailed Mar. 29, 2010, 17 pages.
U.S. Appl. No. 11/926,738, filed Oct. 29, 2007, Office Action mailed Feb. 24, 2010, 12 pages.
U.S. Appl. No. 11/943,101, filed Nov. 20, 2007, Office Action mailed Jul. 8, 2009, 9 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Advisory Action mailed Apr. 16, 2010, 3 pages.
U.S. Appl. No. 12/019,299, filed Jan. 24, 2008, Office Action mailed Mar. 31, 2010, 13 pages.
U.S. Appl. No. 11/024,160, filed Dec. 2004, Maes.
Andrews, Tony et al, Business Process Execution Language for Web Services, Version 1.1, BEA Systems, International Business Machines Corporation, SAP AG, Siebel Systems, May 5, 2003, 31 pages.
Liberty Architecture Overview, Liberty Alliance Project Version 1.1, Piscataway New Jersey, Jan. 15, 2003, 44 pages.
Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.
Maes, Stephanie, Multi-modal Web IBM Position W3C/Wap Workshop, IBM Research Human Language Technologies, downloaded http://www.w3.org on May 26, 2003, 9 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, downloaded http://www.linktionary.com/policy.html on Aug. 2, 2004, 4 pages.
Seely, Scott, "XML and Web Services Security: Understanding WS-Security", Microsoft Corporation, 2002.
Simpson et al, Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm on May 26, 2003, 5 Pages.
Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.
Thomas Manes, Anne, "Registering a Web Service in UDDI", 2003.
U.S. Appl. No. 11/848,347, filed Aug. 31, 2007, Final Office Action mailed May 10, 2010, 15 pages.
U.S. Appl. No. 11/877,129, filed Oct. 23, 2007, Advisory Action mailed Jun. 3, 2010, 2 pages.
U.S. Appl. No. 11/926,738, filed Oct. 29, 2007, Final Office Action mailed Jun. 29, 2010, 12 pages.
U.S. Appl. No. 11/951,500, filed Dec. 6, 2007, Advisory Action mailed Jun. 24, 2010, 2 pages.
U.S. Appl. No. 10/855,999, filed May 28, 2004, Office Action dated Jun. 24, 2010, 20 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.

(56) References Cited

OTHER PUBLICATIONS

U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Romellini, C. et al., "CCXML: The Power of Standardization," Loquendo, Sep. 27, 2005.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Office Action mailed Sep. 30, 2010, 19 pages.
U.S. Appl. No. 11/877,129, filed Oct. 23, 2007, Notice of Allowance mailed Aug. 5, 2010, 6 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Final Office Action mailed Oct. 6, 2010, 20 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Final Office Action dated Nov. 10, 2010, 18 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/939,705, filed Nov. 14, 2007, Office Action mailed Oct. 4, 2010, 21 pages.
International Search Report and Written Opinion of PCT/US2010/037074 mailed Jun. 1, 2011, 16 pages.
U.S. Appl. No. 11/848,347, filed Aug. 31, 2007, Advisory Action mailed May 23, 2011, 3 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Advisory Action mailed Apr. 28, 2011, 3 pages.
U.S. Appl. No. 11/951,500, filed Dec. 6, 2007, Final Office Action mailed Apr. 14, 2011, 33 pages.
U.S. Appl. No. 11/024,160, filed Dec. 27, 2004, Final Office Action dated Jun. 1, 2011, 11 pages.
U.S. Appl. No. 12/019,335, filed Jan. 24, 2008, Office Action mailed May 23, 2011, 18 pages.
U.S. Appl. No. 12/544,484, filed Aug. 20, 2009, Office Action dated Jun. 3, 2011, 6 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/943,101, filed Nov. 20, 2007, Notice of Allowance mailed Dec. 9, 2011, 7 pages.
U.S. Appl. No. 11/951,500, filed Dec. 6, 2007, Advisory Action mailed Jul. 15, 2011, 3 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Advisory Action dated Oct. 12, 2011, 3 pages.
U.S. Appl. No. 12/544,459, filed Aug. 20, 2009, Notice of Allowance mailed Aug. 22, 2011, 8 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/949,930, filed Dec. 4, 2007, Office Action mailed Sep. 29, 2011, 19 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
3rd Generation Partnership Project 2, "Presence Service: Architecture and Functional Description", doc. No. 3GPP2 X.50027-001-0, published on Sep. 2004, 32 pages.
Day, et al., "RFC 2778, A Model for Presence and Instant Messaging", published on Feb. 2000, 12 pages.
U.S. Appl. No. 10/855,999, filed May 28, 2004, Non-Final Office Action dated Mar. 28, 2013, 42 pages.

(56) References Cited

OTHER PUBLICATIONS

U.S. Appl. No. 10/855,999, filed May 28, 2004, Advisory Action dated Mar. 18, 2011, 5 pages.
U.S. Appl. No. 11/070,317, filed Mar. 1, 2005, Notice of Allowance dated Oct. 19, 2012, 11 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action mailed Oct. 29, 2012, 3 pages.
U.S. Appl. No. 12/019,299, filed Jan. 24, 2008, Non Final Office Action mailed Dec. 7, 2012, 21 pages.
U.S. Appl. No. 12/948,247, filed Nov. 17, 2010, Final Office Action mailed Feb. 11, 2013, 25 pages.
U.S. Appl. No. 12/791,129, filed Jun. 1, 2010, Final Office Action mailed Dec. 7, 2012, 9 pages.
U.S. Appl. No. 12/948,450, filed Nov. 17, 2010, Non-Final Office Action mailed Nov. 7, 2012, 48 pages.
U.S. Appl. No. 12/949,183, filed Nov. 18, 2010, Non-final Office Action mailed Nov. 16, 2012, 69 pages.
U.S. Appl. No. 12/949,287, filed Nov. 18, 2010, Non-final Office Action mailed Nov. 19, 2012, 70 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 13/029,219, filed Feb. 17, 2011, Non-Final Office Action mailed Mar. 20, 2013, 65 pages.
U.S. Appl. No. 11/848,347, filed Aug. 31, 2007, Notice of Allowance mailed Mar. 2, 2012, 9 pages.
U.S. Appl. No. 11/951,500, filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.
U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471 filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
U.S. Appl. No. 11/939,705, filed Nov. 14, 2007, Notice of Allowance mailed May 15, 2013, 92 pages.
U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 13/029,226, filed Feb. 17, 2011, Non-Final Office Action mailed May 28, 2013, 47 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.
U.S. Appl. No. 12/045,220, filed Mar. 10, 2008, Non-Final Office Action dated Oct. 7, 2013, 19 pages.
U.S. Appl. No. 11/357,653, filed Feb. 16, 2006, Non-final Office Action dated Jul. 11, 2013, 26 pages.
U.S. Appl. No. 11/357,653, filed Feb. 16, 2006, Final Office Action dated Nov. 26, 2013, 25 pages.
U.S. Appl. No. 12/014,387, filed Jan. 15, 2008, Notice of Allowance mailed Oct. 25, 2013, 17 pages.
U.S. Appl. No. 12/018,718, filed Jan. 23, 2008, Final Office Action mailed Sep. 10, 2013, 55 pages.
U.S. Appl. No. 12/018,718, filed Jan. 23, 2008, Advisory Action mailed Nov. 15, 2013, 3 pages.
U.S. Appl. No. 12/791,129, filed Jun. 1, 2010, Non-Final Office Action mailed Sep. 11, 2013, 10 pages.
U.S. Appl. No. 12/949,183, filed Nov. 18, 2010, Advisory Action mailed Jun. 28, 2013, 3 pages.
U.S. Appl. No. 12/949,183, filed Nov. 18, 2010, Non-Final Office Action mailed Sep. 9, 2013, 18 pages.
U.S. Appl. No. 12/949,287, filed Nov. 18, 2010, Non-final Office Action mailed Aug. 8, 2013, 24 pages.
U.S. Appl. No. 12/949,287, filed Nov. 18, 2010, Final Office Action mailed Nov. 25, 2013, 25 pages.
U.S. Appl. No. 12/957,740, filed Dec. 1, 2010, Non-Final Office Action mailed Aug. 15, 2013, 17 pages.
U.S. Appl. No. 13/029,219, filed Feb. 17, 2011, Final Office Action mailed Oct. 11, 2013, 22 pages.
U.S. Appl. No. 12/957,697, filed Dec. 1, 2010 Non-Final Office Action mailed Oct. 1, 2013, 10 pages.
U.S. Appl. No. 10/855,999, filed May 28, 2004, Final Office Action dated Nov. 18, 2013, 14 pages.

(56) References Cited

OTHER PUBLICATIONS

U.S. Appl. No. 12/019,335, filed Jan. 24, 2008, Final Office Action mailed Jan. 14, 2014, 33 pages.

U.S. Appl. No. 12/791,129, filed Jun. 1, 2010, Final Office Action mailed Dec. 20, 2013, 10 pages.

U.S. Appl. No. 13/029,219, filed Feb. 17, 2011, Advisory Action mailed Jan. 2, 2014, 3 pages.

* cited by examiner

ABSTRACT APPLICATION DISPATCHER

CROSS-REFERENCES TO RELATED APPLICATIONS

This application claims the benefit of U.S. Provisional Application No. 60/896,676, filed Mar. 23, 2007 by Maes and entitled "Call Control Driven MVC Programming Model for Mixing Web and Call or Multimedia Applications," of which the entire disclosure is incorporated herein by reference.

BACKGROUND OF THE INVENTION

Embodiments of the present invention relate generally to methods and systems for providing one or more services within a call or other communication session and more particularly to an abstract application dispatcher.

Various types of services or telephony processing features can be provided within a communication session. For example, in a communication session such as a telephone call, call forwarding, call blocking, caller ID, queuing, queue management, legal intercept, group hunting, parallel or sequential calls, forking, emergency calling, and other services can be provided. In addition, any call can involve additional logic that determines what telephony feature/function to apply next and how. In other environments and with different types of sessions, other services and suites of services can be provided. One example of providing a collection of services is chaining of services in a Public Switched Telephone Network (PSTN). In another example (e.g., Internet protocol Multimedia Subsystem (IMS)), various types of Service Capability Interaction Managers (SCIMs) have been developed as specified by Third Generation Partnership Project 2 (3GPP/2) for IP Multimedia Subsystem (IMS). In yet another example of such services, various types of routing services can be provided in a communication session supported on a Session Initiation Protocol (SIP) network. One example of providing such routing services is described in U.S. patent application Ser. No. 11/383,024 filed May 12, 2006 by Maes and entitled "SIP Routing Customization." In another example, it is also possible to perform routing as described in Java Specification Request (JSR) 289 published by the Java Community Process.

However, these systems are highly dependent on and related to the protocols and technologies supporting the communication session. For example, routing services as typically provided in SIP cannot be easily provided in a PSTN and, conversely, softswitch/PSTN switch routing is quite different from SIP. Similarly, service chaining as provided by switches on a PSTN or IN network is not performed as easily or in the same way in a SIP network. Furthermore, there is not an effective, efficient way to combine different types of services typically offered in different types of networks. Hence, there is a need for improved methods and systems for providing one or more services in a communication session independent of supporting network technologies while providing these capabilities, mechanism, or programming or management approaches to networks where they are typically not available, not common, or not used the same way.

BRIEF SUMMARY OF THE INVENTION

Embodiments of the invention provide systems and methods for providing one or more services in a communication session such as a call or other media exchange that can be independent of supporting network technologies. Therefore, application and/or service dispatching methods can be also carried from network to network. According to one embodiment, a system for providing one or more services in a communication session can comprise a communication network and an application dispatcher communicatively coupled with the communication network. The application dispatcher can be adapted to determine one or more components for providing at least one service in the communication session and direct the communication session to the one or more components. According to one embodiment, determining the one or more components and directing the communication session to the one or more components can be performed independent of supporting network technologies. For example, a call control enabler can be communicatively coupled with the communication network and the application dispatcher and can be adapted to provide a notification of a communication event on the communication network. The communication event can comprise a request from an application, a network event from an endpoint, or another event.

The application dispatcher can be communicatively coupled with the call control enabler (e.g., as any other application built against the call control enabler) and can be adapted to receive the notification of the communication event from the call control enabler, determine one or more components for providing at least one service in the communication session, and direct the communication session to the one or more components. The one or more components can comprise one or more applications and/or another one or more endpoints.

The call control enabler can be adapted to provide an interface for requesting one or more call control functions of the one or more components and the interface can be abstracted from a protocol of the communication network and the one or more components. For example, the communications network can comprise a Public Switched Telephone Network, an intelligent network (IN), a Session Initiation Protocol (SIP) network, an Internet Protocol (IP) network, or another type of network. Directing the communication session to the one or more components can comprise invoking one or more call control functions via the interface of the call control enabler.

In some cases, the services can comprise a plurality of services and directing the communication session to one or more components can comprises directing the communication session to the one or more components in sequence or in parallel. The at least one service can comprise, for example, a call blocking service, a call forwarding service, a caller ID service, forward to a voice mail service, call queuing, call hunting, Service Capability Interaction Manager (SCIM) services, queue management, auto-attendant, a call routing service, queuing, queue management, legal intercept, group hunting, parallel or sequential calls, forking, emergency calling and/or other services.

According to another embodiment, a method for providing one or more services in a communication session can comprise identifying one or more components for providing at least one service in the communication session by an application dispatcher and directing the communication session to the one or more components from the application dispatcher. That is, instead of or in addition to the application dispatcher receiving and reacting to a notification and performing call control as a result, call control can be initiated by the application dispatcher. In such cases, the application dispatcher can establish, monitor, modify (i.e. manage) calls associated to the notification, started by the application dispatcher, or possibly even already in process and by identified to the application dispatcher.

The communication event can comprise a request from an application, a network event from an endpoint, or another event. According to one embodiment, determining the one or more components and directing the communication session to the one or more components can be performed independent of supporting network technologies. For example, an abstract representation of the event can be provided to the application dispatcher from a call control enabler in response to the communication event.

Identifying one or more components for providing at least one service can be based on the communication event, identity of a party to the communication event, services to which the party to the communication event is a subscriber, and/or other criteria. Directing the communication session to the one or more components can comprise invoking one or more call control functions via an interface of the call control enabler. The interface can be abstracted from a protocol of the communication network and the one or more components. Alternatively, the interface can be implemented for one or multiple network/communication protocols, e.g., on a protocol stack.

In some cases, the services can comprise a plurality of services and directing the communication session to one or more components can comprises directing the communication session to the one or more components in sequence or in parallel. The at least one service can comprise, for example, a call blocking service, a call forwarding service, a caller ID service, forward to a voice mail service, call queuing, call hunting, Service Capability Interaction Manager (SCIM) services, queue management, auto-attendant, a call routing service, and/or other services.

According to yet another embodiment, an application dispatcher can comprise an interface and application logic. The application dispatcher can be adapted to receive a communication via the interface, determine how to handle the communication, and direct the communication to a network resource for handling of the communication. For example, the application dispatcher can be pre-programmed with the application logic. In another implementation, the interface of the application dispatcher can comprises a northbound interface and the application dispatcher can be adapted to receive the application logic via the northbound interface. In either case, the application dispatcher can be adapted to determine a context of handling of the communication, determine how to further handle the communication based on the context, and redirect the communication based on the context.

DETAILED DESCRIPTION OF THE INVENTION

Figure 1:
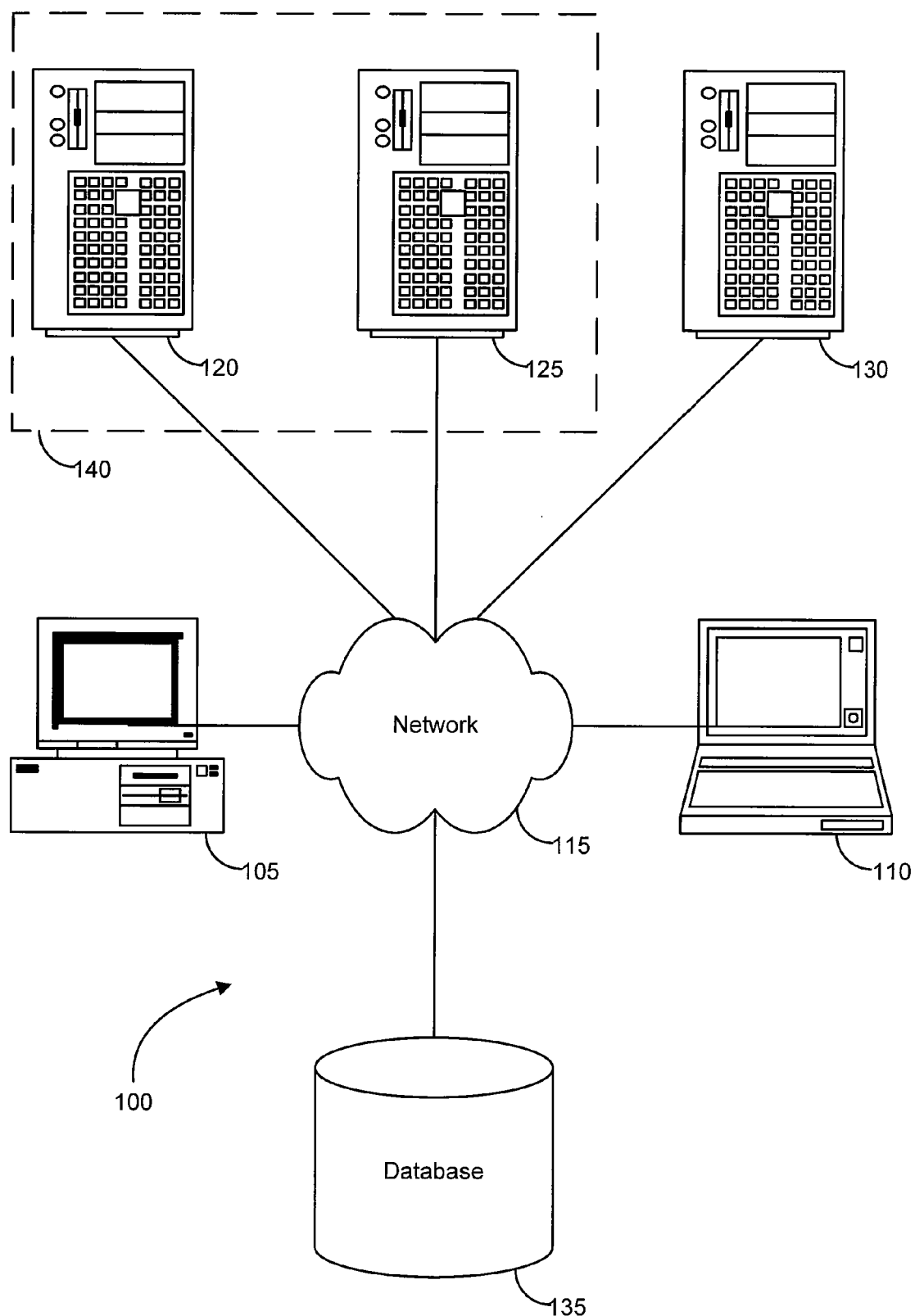
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing one or more services in a communication session. As will be seen, these services can be provided independent of the underlying network and/or device technologies supporting the communication session. More specifically, embodiments of the present invention include a call control enabler for invoking or interacting with various call control functions in a way that is abstracted from the underlying network technologies supporting the call or other media exchange. As used herein, the term enabler refers to a reusable service layer component or components that provide an intrinsic function for use by others (other enablers, applications (i.e. services) or any authorized resource) through appropriate northbound interfaces. Intrinsic means that an enabler does not itself provide functions provided by other enablers nor functions based on service provider policies (e.g. messaging does not include authentication, charging, logging, etc.). An exemplary call control enabler that may be utilized in various embodiments of the present invention is described, for example, in U.S. patent application Ser. No. 11/949,930, filed Dec. 4, 2007, by Maes and entitled "Call Control Enabler Abstracted from Underlying Network Technologies" the entire disclosure of which is incorporated herein by reference for all purposes.

According to one embodiment and as will be described in detail below, an application dispatcher can be implemented with or on the call control enabler, for example in an application layer or service layer of the call control enabler. The application dispatcher can be invoked and/or registered to handle a call or other communication when a network event, request from an application, or other trigger is detected by the call control enabler. The application dispatcher can then determine which other components, e.g., other applications, endpoints, etc., can provide services for the call or session. Via the interface of the call control enabler, the application dispatcher can direct the call or session to one or more other components, serially or in parallel, to interact with the selected services. Since, as described in the application cited above, the call control enabler provides a northbound interface that abstracts the underlying technologies of the network while providing adapters for interfacing with specific networks and devices, the application dispatcher can direct the call or session to one or more other components via the call control enabler without regard to the specific network, protocol, device, etc providing the service. As will be seen other embodiments can be implement without the call control enabler, e.g., by implementing the application dispatcher directly in SIP, Parlay or against other protocols.

As will be described, an application dispatcher can comprise an interface and application logic. The application dispatcher can be adapted to receive a communication via the interface, determine how to handle the communication, and direct the communication to a network resource for handling of the communication. For example, the application dispatcher can be pre-programmed with the application logic. In another implementation, the interface of the application dispatcher can comprises a northbound interface and the application dispatcher can be adapted to receive the application logic via the northbound interface. In either case, the application dispatcher can be adapted to determine a context of handling of the communication, determine how to further handle the communication based on the context, and redirect the communication based on the context.

That is, the application dispatcher can have an interface and logic, e.g., a set of policies, that are either pre-programmed into the application dispatcher or loaded into the application dispatcher via the interface. Based on this logic, the application dispatcher can decide how to handle or process a call or other communication session. The logic can be applied to ongoing as well as new sessions. As processing takes place, the logic may decide to process differently. Thus, based on the context, i.e., the past or current handling or processing of the session, the behavior or handling of the session can be changed. Handling of the session can continue in this manner until the session ends or is released by the application dispatcher. As noted this processing can be performed independent of the network technology and so can perform routing across networks including legacy PSTN/IN or NGN networks such as the Internet, an intarnet, VoIp, IMS, etc.

Additional details of various embodiments of the present invention will be described below with reference to FIGS. 1-8.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g. the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g. a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
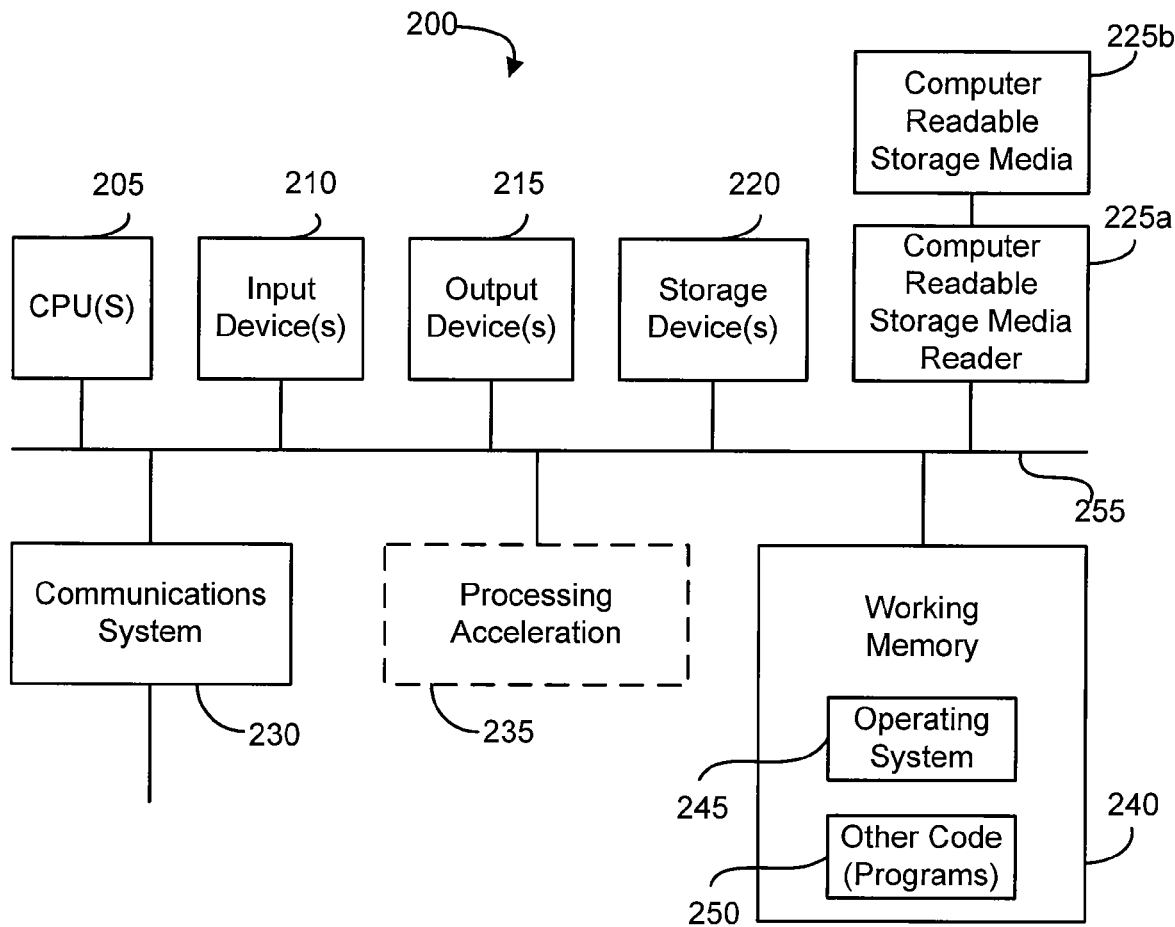
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
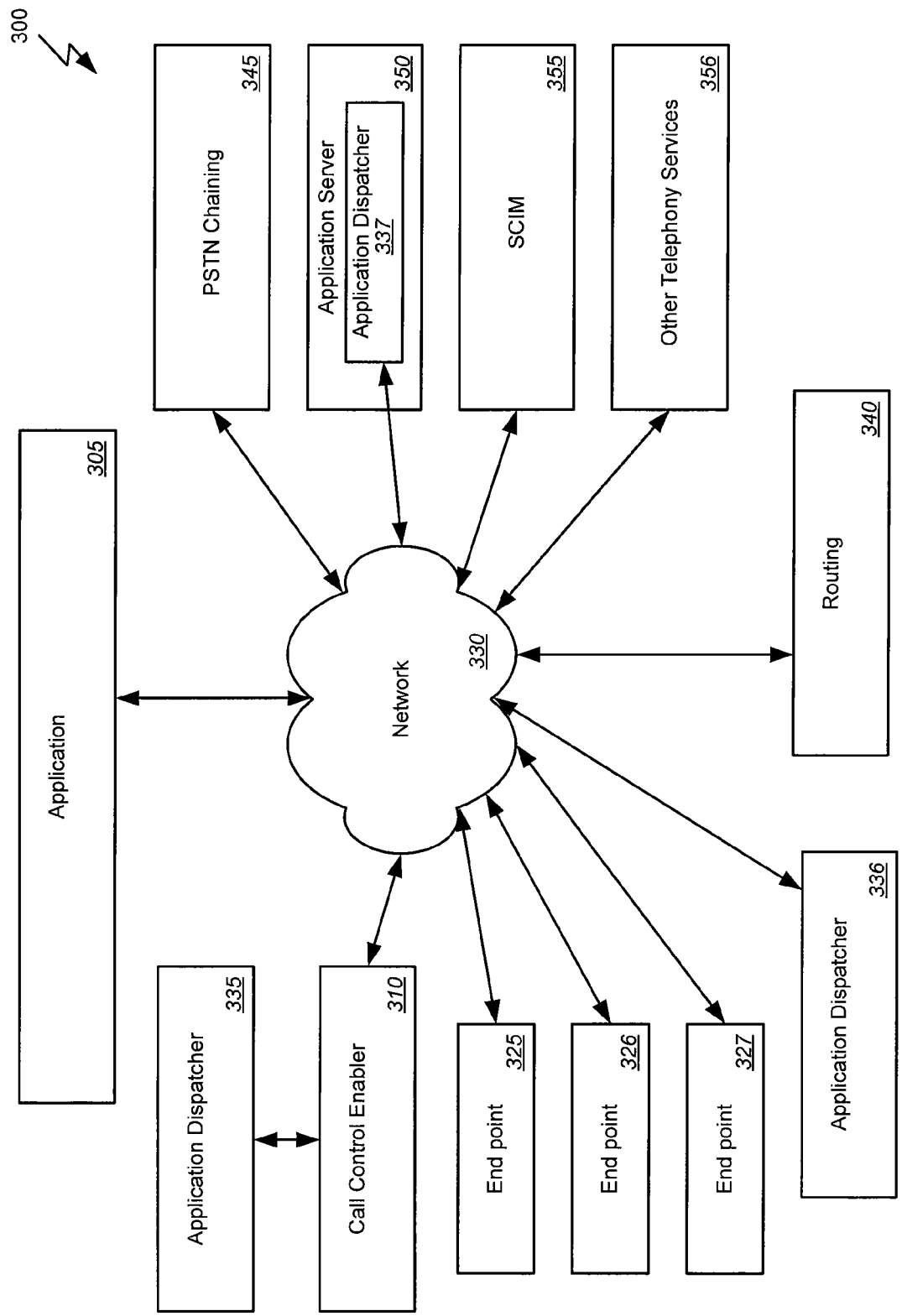
FIG. 3 is a block diagram illustrating, at a high-level, functional components of a system for providing one or more services in a communication session according to one embodiment of the present invention.

FIG. 3 is a block diagram illustrating, at a high-level, functional components of a system for providing one or more services in a communication session according to one embodiment of the present invention In this example, a system 300 can comprise a communications network 330, a call control enabler 310, and other components 340-356 providing various services communicatively coupled with the communications network 330. A communication device or endpoint 325 can be communicatively coupled with the communications network 330. The endpoint 325 can be adapted to initiate a communication session with other endpoints 326 and 327 or other elements of the system 300 over the communications network 330 via a signaling protocol, such as, for example, SIP. In other cases, the endpoint 325 may be the callee and the call or session may be initiated by an application 305 or other element of the system 300. Again, the call or communication session may be initiated via a signaling protocol, such as, for example, SIP. As described here, signaling is separated from the media exchanges. However, as can be understood by one skilled in the art, such separation is not required. Rather embodiments of the present invention can also be implemented in cases where the signaling and media exchanges are combined.

Regardless of whether the call or session is initiated by the endpoint 325, the application 305 or other element of the system 300, the call control enabler 310 can be adapted to receive a request to perform a call control function, such as initiating a call with other elements of the system 300. Upon receiving the request, the call control enabler 310 can be adapted to invoke and/or register the application dispatcher 335 to handle the call or session. According to one embodiment, the application dispatcher 335 can be implemented on the call control enabler 310, for example in an application layer or service layer of the call control enabler. In other cases, the application dispatcher 335 may be separate of remote from the call control enabler 310.

When a call arrives from the network 330, the call control enabler 310 abstracts it. That is, the call control enabler 310 can notify the application dispatcher 335 as with any other application registering to the call and pass to the application dispatcher 335 a call identifier and endpoint details such as a source endpoint, target endpoint, etc., to the application dispatcher 335 via a northbound interface of the call control enabler 310. That is, the application dispatcher 335 can register for events with the call control enabler 310 and then receive notification of the events from the call control enabler 310 as they occur. Upon receiving the events or notification of the events, the application dispatcher 335 can execute any policy, defined as a combination of any condition and any one or more corresponding actions, to determine where to send the call next. It should be noted that the policies applied by the application dispatcher 335 can comprise any logic to determine how to handle the call or communication session ranging from simple routing to more advanced logic. If the call is initiated between two or more parties or affects an existing two-party or multi-party call, for example as determined based on the call identifier etc., the application dispatcher 335 can again affect the call based on policies. That is, the application dispatcher 335 can also register and receive other call event such as mid-call/termination or process established calls to redirect, terminate, split, add parties, etc.

The policies applied by the application dispatcher can involve any information in the service level context and call and/or delegate any other elements. This way integration/composition at the service level or via service level interfaces at any other level can be involved in the dispatching process/policy enforcement. That is, the application dispatcher 335 can determine, based on policies, which other components, e.g., other applications, servers, endpoints, etc., can provide services for the call or session. For example, components 340-355 of the system 300 can include, but are not limited to, components providing routing services 340, components providing SCIM services 355, components providing PSTN chaining services 345, other telephony services 356, etc. Other services provided by these or other components (not shown here) can include but are not limited to, call forwarding services, call blocking services, caller ID services, voicemail services, etc. Identifying one or more components for providing the service or services can be based on policies of the application dispatcher 335 and other considerations such as the communication event triggering the call control enabler, e.g., the call or session initiation message can identify or be correlated to a particular service. In other cases, determining which services to provide can be based on an identity of a party to the communication event, services to which the party to the communication event is a subscriber, and/or other criteria. In other words, any logic can be applied to perform any of a variety of functions with the call.

Once the application dispatcher 335 has identified the appropriate service or services, the application dispatcher 335 can direct the call or session to the component or components providing those service(s). Directing the communication session to the one or more components can comprise the application dispatcher 335 invoking one or more call control functions via an interface of the call control enabler 310. That is, via the interface of the call control enabler 310, the application dispatcher 335 can direct the call or session to one or more other components 340-356, serially or in parallel, to interact with the selected services. Since, as described in the application entitled "Call Control Enabler Abstracted from Underlying Network Technologies" cited above, the call control enabler 310 provides a northbound interface that abstracts the underlying technologies of the network while providing adapters for interfacing with specific networks, devices, components, etc., the application dispatcher 335 can direct the call or session to one or more other components 340-356 via the call control enabler 310 without regard to the specific network 330, protocol, device, etc providing the service.

Additionally or alternatively, an application dispatcher 336 can be implemented on a communication protocol of the communication network 330. That is, rather than being implemented on or with a call control enabler 310 as described above, the application dispatcher may be implemented as a component on the network 330 and communicating via the protocol of the network 330. For example, the application dispatcher 336 can be implemented in or adapted to Parlay for an IN or PSTN network 330. In another example, the application dispatcher 336 can be implemented as a SIP servlet for an Internet, intranet, or IMS network 330. Various other protocols and implementations are contemplated and considered to be within the scope of the present invention. According to one embodiment, an application dispatcher 337 may be implemented directly on the network protocol by or as part of an application server 350 such as, for example, a SIP application server, a OSA application server, a Parlay X application server, a telephony application server, etc., to implement the dispatching function with the underlying protocol. However, even though the application dispatcher can be implemented on SIP, Parlay, IN or another protocol, it may act independent of the network upon which it is implemented.

As with the application dispatcher 335 described above implemented on or with a call control enabler 310, an application dispatcher 336 or 377 implemented on a network protocol can be adapted to detect and respond to network events by applying one or more policies to the events or information related to the events or to initiate actions by other elements of the system 300. However, rather than receiving abstracted event information via the call control enabler 310, an application dispatcher 336 implemented on the protocol of the communication network 330 can be adapted to detect events occurring on the network 330 in the protocol of the network 330. Similarly, rather than requesting actions of other components of the system 300 via the call control enabler, an application dispatcher 336 implemented on the protocol of the communication network 330 can be adapted to request actions via messages of the protocol of the network 330.

According to one embodiment, the application dispatcher 335, 336, or 337, whether implemented on or with a call control enabler 310 or directly on a network protocol, either via an application server 350 or otherwise, may be implemented as an enabler itself. That is, the application dispatcher 35, 336, or 337 may be implemented with a northbound interface that abstracts the functions provided thereby. Via such an interface, the application dispatcher can interface and interact with, e.g., provide notifications to and receive directions from, another application such as application 305. So, for example, via a northbound interface the application dispatcher can load the policies or dispatching logic to process dispatched calls accordingly.

Figure 4:
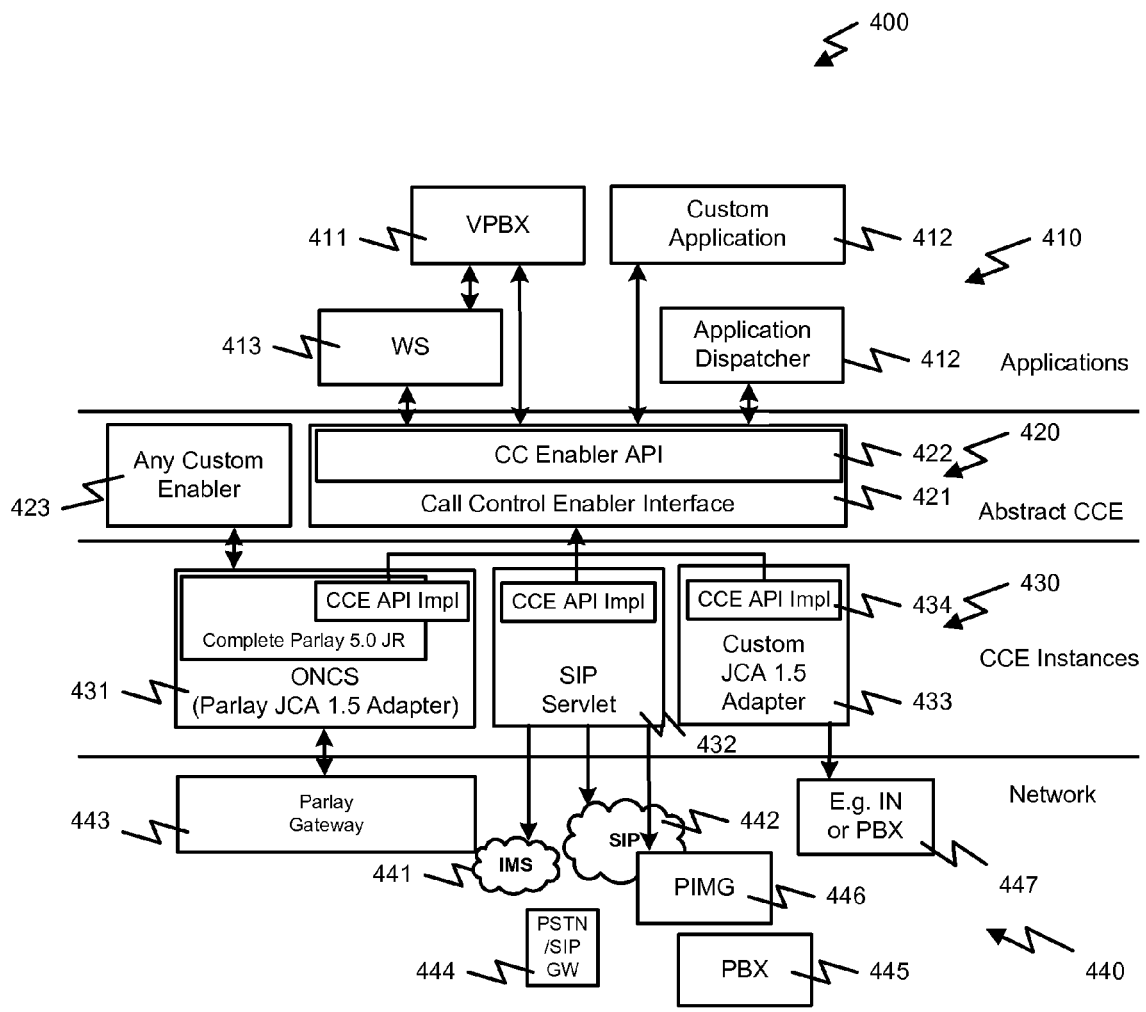
FIG. 4 is a block diagram illustrating details of a call control enabler with which an application dispatcher may be implemented according to one embodiment of the present invention.

As noted above, an exemplary call control enabler 310 with which or on which an application dispatcher 335 as described herein can be implemented is described, for example, in the application entitled "Call Control Enabler Abstracted from Underlying Network Technologies" referenced above, a portion of which is summarized here for convenience. FIG. 4 is a block diagram illustrating details of a call control enabler as described in the cited application. As noted therein, the implementation of the call controller 400 can be divided into a number of logical layers including, but not limited to, a layer of applications 410, a layer comprising one or more abstract call control enablers 420, a layer comprising specific call control enabler instances 430 or implementations, and a network layer 440. Generally speaking, the application layer 410 can comprise any of a number of specific applications that may interface and/or interact with the call control enablers 420 and 430. For example, the applications can include, but are not limited to, a web service 413, Public Branch exchange (PBX) applications, Virtual Public Branch eXchange (VPBX) applications, any number of custom applications 412, etc.

The abstract call control enabler layer 420 can include, but is not limited to, any of a number of custom enablers 423 and one or more call control enabler interfaces 421. Generally speaking, the call control enabler interfaces 421 according to one embodiment can provide high-level interfaces such as, for example, Application Program Interfaces (APIs) 422. Via the interfaces 422, applications 410 can call or invoke various functions or features of the call control enabler 400. For example, the APIs 422 provided by the abstract call control enabler layer 420 can include, but is not limited to, APIs for call creation, call forwarding and/or redirection, call handling and conferencing, adding multiple parties to a call, call notifications, etc. Upon invocation by an application 410 via the API 422, one or more instances of the call control enabler may be instantiated. That is, one or more call control enabler instances can be created for specific call control enabler implementations based on the request from the applications 410 via the API 422. As explained in detail in the cited application, the individual call control enabler instances 430 can be implemented in many ways to perform various functions and provide adapters 431-434 to network resources 441-447.

Thus, the northbound interface 421 of the call control enabler 400 can provide an abstract interface for invoking one or more of a plurality of call control functions. For example, the one or more call control functions can comprise establishing a connection with a second network resource such as the dialog manager or another media processing node as described above with reference to FIG. 3. Thus, as described in detail in the cited application, one or more applications 410 can use the call control enabler and the abstraction provided thereby to receive abstracted notification of network events and/or request actions of other network resources via the northbound interface of the call control enabler. As illustrated, the applications 410 can include an application dispatcher 414. As with other applications 410 the application dispatcher can register with the call control enabler and receive abstracted notification of network events and/or request actions of other network resources via the northbound interface of the call control enabler.

Therefore, in use, the call control enabler 400 can be adapted to receive a request to perform a call control function from the application dispatcher 414 via the northbound interface 422 and/or request the call control function of the service via the appropriate southbound interface or adapter 431-433. Requesting the selected services can comprise, for example sending an invitation to join the session or otherwise initiate communication with the other parties to the communication. According to one embodiment, the invitation or other message may include an indication of the services to be performed, the parties to be involved, and/or other criteria. In some cases, the call control enabler 400 can be further adapted to receive results of the call control function from the service via the southbound interface or adapter 431-433 and return the results to the application dispatcher 414 via the northbound interface 422. Based on the returned results, the application dispatcher 414 may then select and invoke additional services. In other cases, the application dispatcher 414 can be adapted to react to notification of events received from the network 440 via the call control enabler 400. In such cases, the application dispatcher 414 can be adapted to apply one or more policies to the event or information related to the event to identify one or more services or other elements of the system for supporting the call or session.

According to one embodiment, the application dispatcher 414 can expose a northbound interface of its own to allow other applications 412 to control or interact with the policies and/or routing details of the application dispatcher or even to allow real time interaction with the dispatcher. That is, the application dispatcher 414 can be adapted to behave in a manner similar to the call control enabler 400 itself in that the application dispatcher can notify, via its own northbound interface, another process or application that has registered for the notification and receive in exchange, also via the northbound interface, the rules or policies to be applied. It should be noted that as mentioned above, the application dispatcher can be implemented directly on the network protocol and that the call control enabler described here is not required to support the application dispatcher. Furthermore, even if implemented directly on the network protocol, the application dispatcher may still provide a northbound interface of its own allowing for interaction with, i.e., providing notifications to and receiving rules/policies from, other application.

Figure 5:
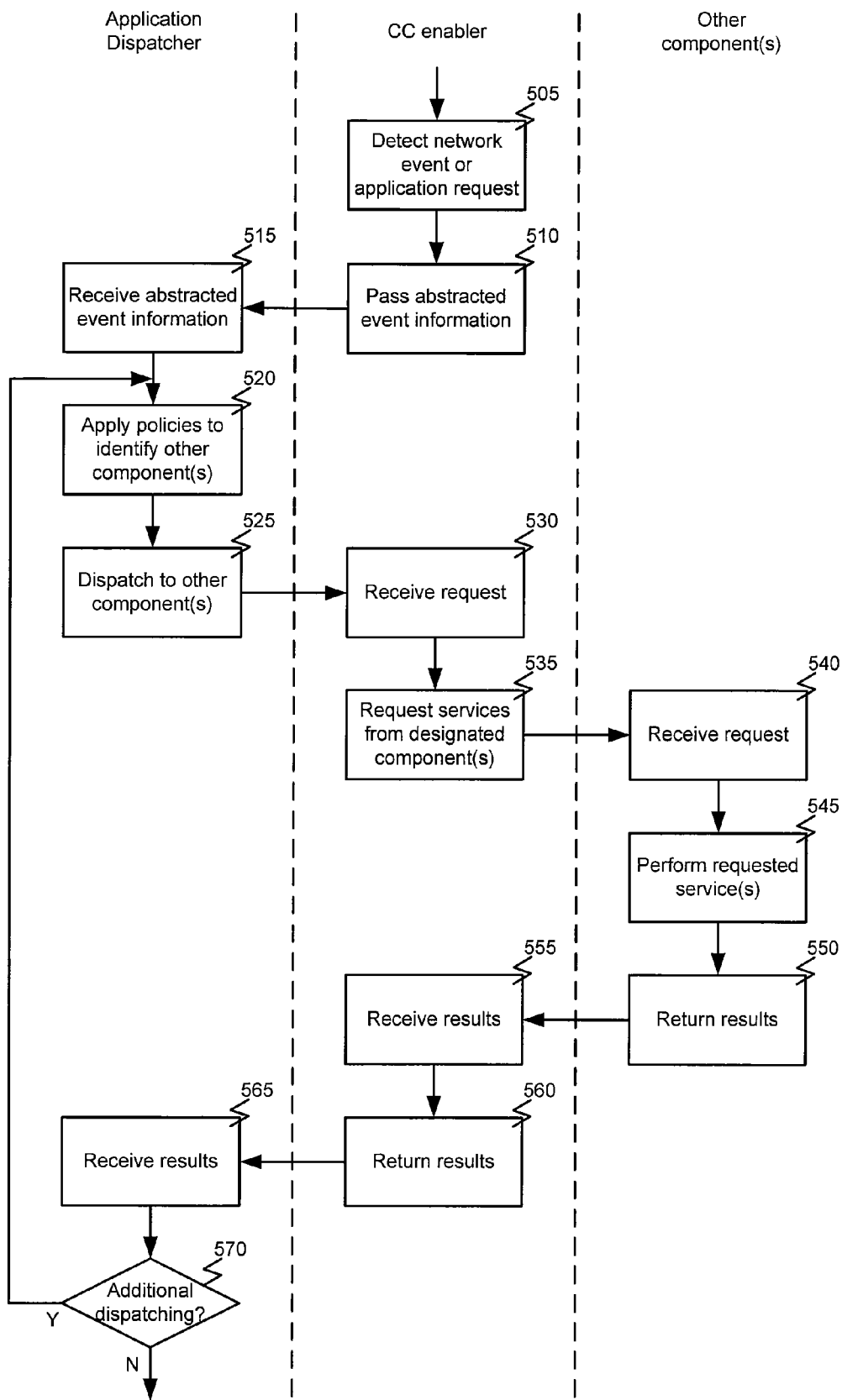
FIG. 5 is a flowchart illustrating a process for providing one or more services in a communication session according to one embodiment of the present invention.

FIG. 5 is a flowchart illustrating a process for providing one or more services in a communication session according to one embodiment of the present invention. More specifically, this example illustrates a process in which the application dispatcher, via a call control enabler, receives abstracted event information and dispatches handling of the event to other components. In this example, processing begins with detecting 505 a communication event with a call control enabler. The communication event can comprise a request from an application, a network event from an endpoint, or another event. When the call is received or detected 505, the call control enabler abstracts it. That is, the call control enabler can pass 510 a call identifier and endpoint details such as a source endpoint, target endpoint, etc., to the application dispatcher via a northbound interface of the call control enabler.

The application dispatcher can, upon receiving 515 the abstracted event information from the call control enabler, apply one or more policies to the event or information related to the event determine or identify 520 one or more components for providing at least one service in the communication session. Identifying 520 one or more components for providing at least one service can be based on the communication event, identity of a party to the communication event, services to which the party to the communication event is a subscriber, and/or other criteria. The communication session can be directed or dispatched 525 to the one or more components from the application dispatcher. Directing or dispatching 525 the communication session to the one or more components can comprise invoking one or more call control functions via an interface of the call control enabler. Therefore, the call control enabler can receive 530 a request for one or more call control functions, e.g., via the abstract, northbound interface of the call control enabler, and in turn request 535 the specified service or services from the identified component or components, serially or in parallel, e.g., via the specific instances or adapters of the southbound interface of the call control enabler. Requesting the selected services can comprise, for example sending an invitation to join the session or otherwise initiate communication with the other parties to the communication. According to one embodiment, the invitation or other message may include an indication of the services to be performed, the parties to be involved, and/or other criteria.

The selected component or components can receive 540 the request from the call control enabler. For example, the selected component(s) can receive and accept an invitation to join the session or otherwise initiate communication with the other parties to the communication. The selected component(s) can the perform 545 the requested services. In some cases, services may collect and return 550 results of the service(s) to the call control enabler. The call control enabler can be further adapted to receive 555 such results from the service, e.g., via the southbound interface or adapter, and return 560 the results to the application dispatcher, e.g., via the northbound interface of the call control enabler. The application dispatcher can in turn receive 565 the results and determine 570, based on the returned results, the initial request, the state of the session, or other criteria, whether to request additional services. In response to determining 570 to request additional services, the application dispatcher can again identify 520 components for providing those services and dispatch 525 the session to those components via the call control enabler.

Figure 6:
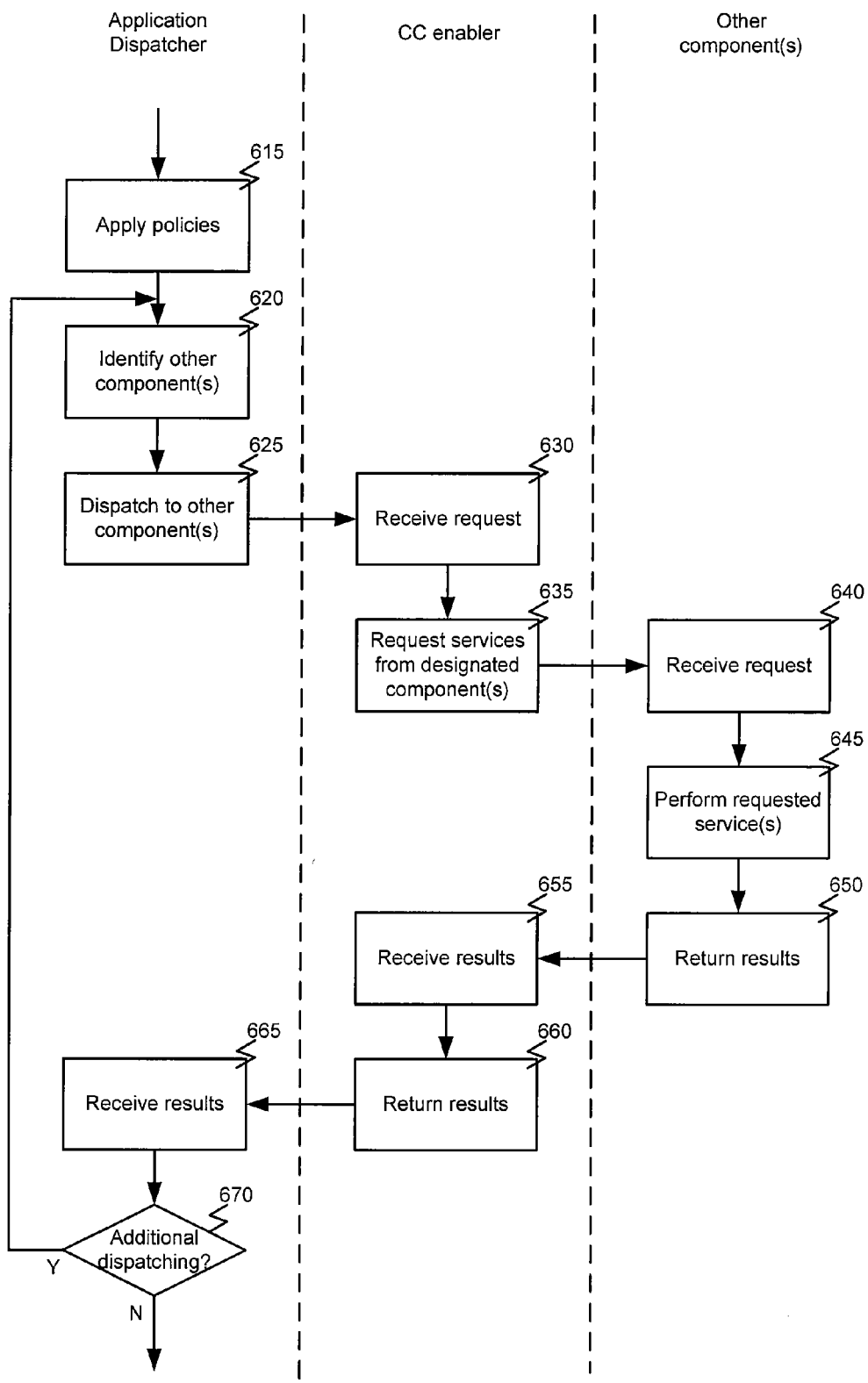
FIG. 6 is a flowchart illustrating a process for providing one or more services in a communication session according to an alternative embodiment of the present invention.

FIG. 6 is a flowchart illustrating a process for providing one or more services in a communication session according to an alternative embodiment of the present invention. More specifically, this example illustrates a process in which the application dispatcher initiates an action on the network. While such a process may be less commonly implemented than the process described above with reference to FIG. 5, it should be understood that this process is nevertheless a possible implementation of the application dispatcher considered to be within the scope of the present invention. In this example, processing begins with the application dispatcher applying 615 one or more policies to one or more application events, states, or other information. Based on application 615 of the policies, the application dispatcher can determine or identify 620 one or more components for providing at least one service in the communication session. The communication session can be directed or dispatched 625 to the one or more components from the application dispatcher. Directing or dispatching 625 the communication session to the one or more components can comprise invoking one or more call control functions via an interface of the call control enabler. Therefore, the call control enabler can receive 630 a request for one or more call control functions, e.g., via the abstract, northbound interface of the call control enabler, and in turn request 635 the specified service or services from the identified component or components, serially or in parallel, e.g., via the specific instances or adapters of the southbound interface of the call control enabler. Requesting the selected services can comprise, for example sending an invitation to join the session or otherwise initiate communication with the other parties to the communication. According to one embodiment, the invitation or other message may include an indication of the services to be performed, the parties to be involved, and/or other criteria.

The selected component or components can receive 640 the request from the call control enabler. For example, the selected component(s) can receive and accept an invitation to join the session or otherwise initiate communication with the other parties to the communication. The selected component(s) can the perform 645 the requested services. In some cases, services may collect and return 650 results of the service(s) to the call control enabler. The call control enabler can be further adapted to receive 655 such results from the service, e.g., via the southbound interface or adapter, and return 660 the results to the application dispatcher, e.g., via the northbound interface of the call control enabler. The application dispatcher can in turn receive 665 the results and determine 670, based on the returned results, the initial request, the state of the session, or other criteria, whether to request additional services. In response to determining 670 to request additional services, the application dispatcher can again identify 620 components for providing those services and dispatch 625 the session to those components via the call control enabler.

Figure 7:
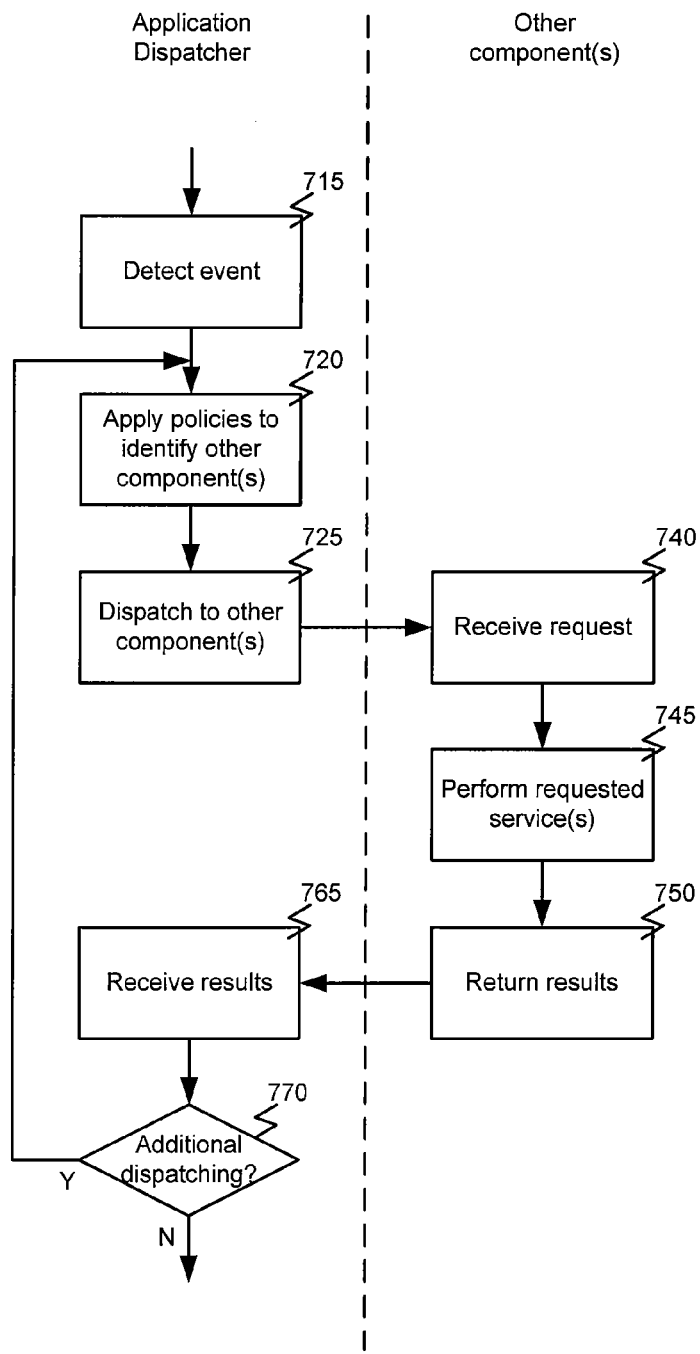
FIG. 7 is a flowchart illustrating a process for providing one or more services in a communication session according to another alternative embodiment of the present invention.

FIG. 7 is a flowchart illustrating a process for providing one or more services in a communication session according to another alternative embodiment of the present invention. More specifically, this example illustrates a process in which the application dispatcher receives abstracted event information and dispatches handling of the event to other components. While similar to the process described above with reference to FIG. 5, this process illustrates an implementation in which the application dispatcher is implemented on the network protocol without a call control enabler. In this example, processing begins with the application dispatcher detecting 715 a communication event on the communication network, i.e., via the communication protocol, or a resource like a network gateway (e.g. PBX, softswitch, parlay GW, IN GW), or SIP application server, OSA application server, telephony application server, etc. The communication event can comprise a request from an application, a network event from an endpoint, or another event. When the event is received or detected 715, the call control enabler abstracts it.

The application dispatcher can, upon detecting 715 the event, apply one or more policies to the event or information related to the event determine or identify 720 one or more components for providing at least one service in the communication session. Identifying 720 one or more components for providing at least one service can be based on the communication event, identity of a party to the communication event, services to which the party to the communication event is a subscriber, and/or other criteria. The communication session can be directed or dispatched 725 to the one or more components from the application dispatcher. Directing or dispatching 725 the communication session to the one or more components can comprise, for example, sending an invitation to join the session or otherwise initiate communication with the other parties to the communication via the protocol of the communication network. According to one embodiment, the invitation or other message may include an indication of the services to be performed, the parties to be involved, and/or other criteria.

The selected component or components can receive 740 the request from the application dispatcher. For example, the selected component(s) can receive and accept an invitation to join the session or otherwise initiate communication with the other parties to the communication. The selected component(s) can the perform 745 the requested services. In some cases, services may collect and return 750 results of the service(s) to the application dispatcher. The application dispatcher can in turn receive 765 the results and determine 770, based on the returned results, the initial request, the state of the session, or other criteria, whether to request additional services. In response to determining 770 to request additional services, the application dispatcher can again identify 720 components for providing those services and dispatch 725 the session to those components via the protocol of the communication network.

Figure 8:
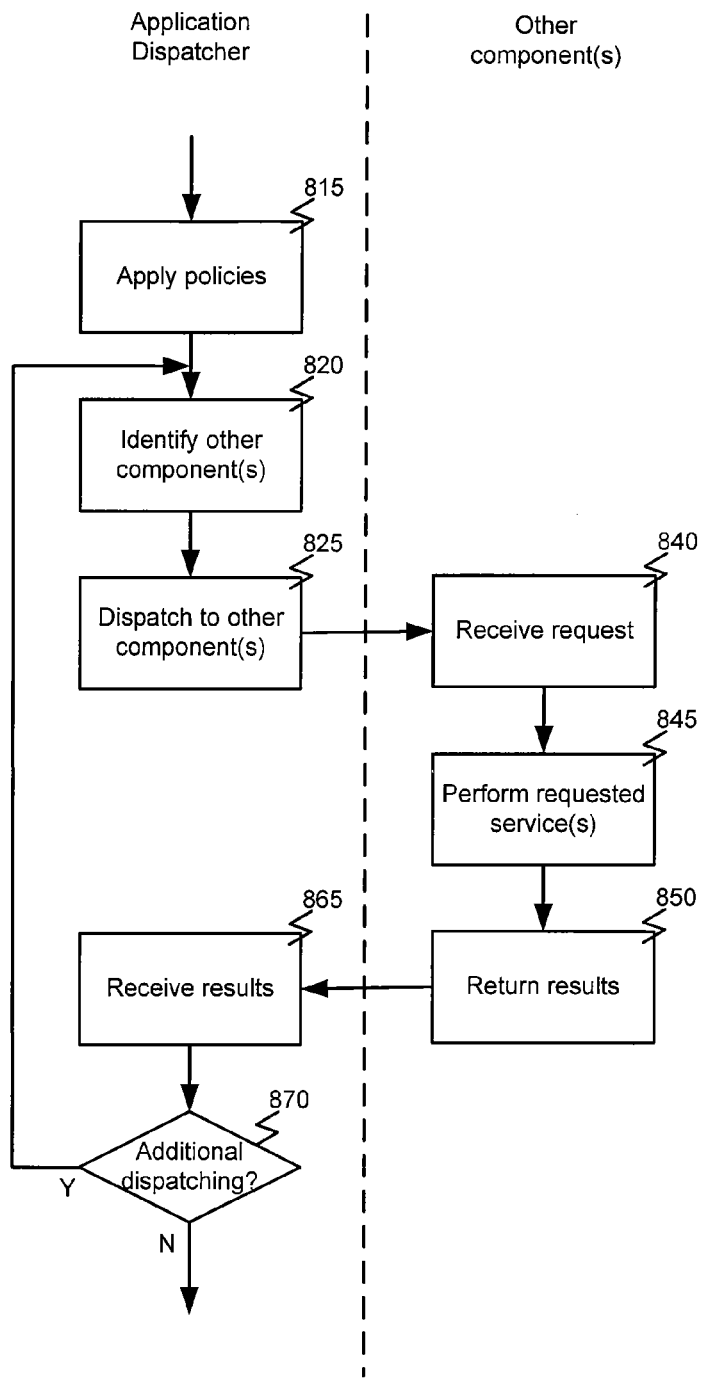
FIG. 8 is a flowchart illustrating a process for providing one or more services in a communication session according to yet another alternative embodiment of the present invention.

FIG. 8 is a flowchart illustrating a process for providing one or more services in a communication session according to yet another alternative embodiment of the present invention. More specifically, this example illustrates a process in which the application dispatcher initiates an action on the network. While similar to the process described above with reference to FIG. 6, this process illustrates an implementation in which the application dispatcher is implemented on the network protocol without a call control enabler. In this example, processing begins with the application dispatcher applying 815 one or more policies to one or more application events, states, or other information. Based on application 815 of the policies, the application dispatcher can determine or identify 820 one or more components for providing at least one service in the communication session. The communication session can be directed or dispatched 825 to the one or more components from the application dispatcher. Directing or dispatching 825 the communication session to the one or more components can comprise, for example sending an invitation to join the session or otherwise initiate communication with the other parties to the communication via a protocol of the communication network. According to one embodiment, the invitation or other message may include an indication of the services to be performed, the parties to be involved, and/or other criteria.

The selected component or components can receive 840 the request from the application dispatcher. For example, the selected component(s) can receive and accept an invitation to join the session or otherwise initiate communication with the other parties to the communication. The selected component(s) can the perform 845 the requested services. In some cases, services may collect and return 850 results of the service(s) to the application dispatcher. The application dispatcher can in turn receive 865 the results and determine 870, based on the returned results, the initial request, the state of the session, or other criteria, whether to request additional services. In response to determining 870 to request additional services, the application dispatcher can again identify 820 components for providing those services and dispatch 825 the session to those components via the protocol of the communication network.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for providing one or more services in a communication session, the system comprising:
   a communication network;
   a call control enabler communicatively coupled with the communications network, the call control enabler adapted to provide a notification of a communication event on the communication network and to request one or more call control functions of one or more components of the communication network; and
   an application dispatcher communicatively coupled with the call control enabler and adapted to receive the notification of the communication event from the call control enabler, apply one or more service level policies to the notification, determine based on the applied service level policies one or more components for providing at least one service in the communication session, and dispatch the communication session to one or more components of the communication network for processing of the communication session by directing the communication session to the determined one or more components by invoking one or more call control functions of the call control enabler in response to the notification, the one or more components for providing at least one service in the communication session.

2. The system of claim 1, wherein the one or more components comprise at least one application.

3. The system of claim 1, wherein the application dispatcher is implemented on the protocol of the communication network.

4. The system of claim 3, wherein the application dispatcher is implemented by an application server.

5. The system of claim 1, wherein the one or more components comprise at least on endpoint.

6. The system of claim 1, wherein the communication event comprises a request from an application.

7. The system of claim 1, wherein the communication event comprises a network event from an endpoint.

8. The system of claim 1, wherein the at least one service comprises a plurality of services.

9. The system of claim 8, wherein directing the communication session to one or more components comprises directing the communication session to the one or more components in sequence.

10. The system of claim 8, wherein directing the communication session to one or more components comprises directing the communication session to the one or more components in parallel.

11. The system of claim 1, wherein the call control enabler is adapted to provide an interface for requesting one or more call control functions of the one or more components and the interface is abstracted from a protocol of the communication network and the one or more components.

12. The system of claim 11, wherein directing the communication session to the one or more components comprises invoking one or more call control functions via the interface of the call control enabler.

13. The system of claim 1, wherein the at least one service comprises a call blocking service.

14. The system of claim 1, wherein the at least one service comprises a call forwarding service.

15. The system of claim 1, wherein the at least one service comprises a caller ID service.

16. The system of claim 1, wherein the at least one service comprises a voice mail service.

17. The system of claim 1, wherein the at least one service comprises a call routing service.

18. The system of claim 1, wherein the at least one service comprises Service Capability Interaction Manager (SCIM) services.

19. The system of claim 1, wherein the communications network comprises a Public Switched Telephone Network.

20. The system of claim 1, wherein the network comprises a Session Initiation Protocol (SIP) network.

21. The system of claim 1, wherein the network comprises an Internet Protocol (IP) network.

22. The system of claim 1, wherein the application dispatcher comprises a northbound interface adapted to provide an abstract interface to functions provided by the application dispatcher.

23. The system of claim 22, wherein the application dispatcher is adapted to provide notification of network events to one or more registered applications via the northbound interface.

24. The system of claim 22, wherein the application dispatcher is adapted to receive instructions for handling communications sessions via the northbound interface.

25. A method for providing one or more services in a communication session, the method comprising:
    detecting a communication event with a call control enabler;
    providing an abstract representation of the communication event to an application dispatcher from the call control enabler in response to the communication event;
    receiving the abstract representation of the communication event from the call control enabler at the application dispatcher;
    identifying with the application dispatcher based on the received communication event one or more components for providing at least one service in the communication session; and
    dispatching the communication session to the one or more components from the application dispatcher by directing the communication session to the determined one or more components by invoking one or more call control functions of the call control enabler.

26. The method of claim 25, wherein directing the communication session to the one or more components from the application dispatcher is performed independent of supporting network technologies.

27. The method of claim 25, wherein identifying with the application dispatcher one or more components for providing at least one service in the communication session is based on applying one or more service level policies to the abstract representation of the communication event by the application dispatcher.

28. The method of claim 25, wherein identifying the one or more components and directing the communication session to the one or more components are performed in response to a request from an application.

29. The method of claim 25, wherein dispatching the communication session to the one or more components is performed via a communication protocol supporting the communication session.

30. The method of claim 25, wherein the communication event comprises a network event from an endpoint.

31. The method of claim 25, wherein identifying one or more components for providing at least one service is based on the communication event.

32. The method of claim 25, wherein identifying one or more components for providing at least one service is based on a party to the communication event.

33. The method of claim 28, wherein identifying one or more components for providing at least one service is further based on services to which the party to the communication event is a subscriber.

34. The method of claim 25, wherein the at least one service comprises a plurality of services.

35. The method of claim 34, wherein directing the communication session to one or more components comprises directing the communication session to the one or more components in sequence.

36. The method of claim 34, wherein directing the communication session to one or more components comprises directing the communication session to the one or more components in parallel.

37. The method of claim 25, wherein directing the communication session to the one or more components comprises invoking one or more call control functions via an interface of the call control enabler, wherein the interface is abstracted from a protocol of the communication network and the one or more components.

38. The method of claim 25, wherein the at least one service comprises a call blocking service.

39. The method of claim 25, wherein the at least one service comprises a call forwarding service.

40. The method of claim 25, wherein the at least one service comprises a caller ID service.

41. The method of claim 25, wherein the at least one service comprises a voice mail service.

42. The method of claim 25, wherein the at least one service comprises a call routing service.

43. The method of claim 25, wherein the at least one service comprises Service Capability Interaction Manager (SCIM) services.

44. The method of claim 25, further comprising providing notification of a network event to one or more registered applications via a northbound interface of the application dispatcher.

45. The method of claim 25, further comprising receiving instructions for handling communications sessions via a northbound interface of the application dispatcher.

* * * * *

UNITED STATES PATENT AND TRADEMARK OFFICE
CERTIFICATE OF CORRECTION

PATENT NO. : 8,744,055 B2  Page 1 of 1
APPLICATION NO. : 11/969343
DATED : June 3, 2014
INVENTOR(S) : Maes It is certified that error appears in the above-identified patent and that said Letters Patent is hereby corrected as shown below:

In the Specification

Column 6, line 22, delete "intarnet," and insert -- intranet, --, therefor.

Column 6, line 46, delete "(e.g." and insert -- (e.g., --, therefor.

Column 6, line 57, delete "may be" and insert -- maybe --, therefor.

Column 6, line 62, delete "(e.g." and insert -- (e.g., --, therefor.

Column 10, line 60, delete "35," and insert -- 335, --, therefor.

Column 11, line 18, delete "exchange" and insert -- eXchange --, therefor.

Signed and Sealed this
Third Day of February, 2015

Michelle K. Lee
*Deputy Director of the United States Patent and Trademark Office*